United States Patent [19]

Deets

[11] 4,109,067

[45] Aug. 22, 1978

[54] POLYMER COMPOSITIONS EVOLVING REDUCED AMOUNTS OF NOXIOUS GASES ON COMBUSTION

[75] Inventor: Gary L. Deets, Springfield, Mass.

[73] Assignee: Monsanto Company, St. Louis, Mo.

[21] Appl. No.: 817,942

[22] Filed: Jul. 22, 1977

[51] Int. Cl.$^2$ ................................................ C08K 5/16
[52] U.S. Cl. .................... 526/4; 260/45.75 C; 260/45.75 M; 260/45.75 P; 260/45.75 W
[58] Field of Search ...................... 526/4; 260/45.75 C, 260/45.75 N, 45.75 G, 45.75 M, 45.75 P, 45.75 W

[56] References Cited

U.S. PATENT DOCUMENTS

| | | | |
|---|---|---|---|
| 3,821,163 | 6/1974 | Spivack | 260/45.75 C |
| 3,825,520 | 7/1974 | Parts | 260/45.75 C |
| 3,862,099 | 1/1975 | Marans | 526/4 |
| 3,876,598 | 4/1975 | Brackman | 526/4 |
| 3,965,068 | 6/1976 | Dickens | 260/45.75 W |
| 3,975,382 | 8/1976 | Avar | 260/45.75 C |
| 3,985,828 | 10/1976 | Lucas | 260/45.75 G |

*Primary Examiner*—Paul R. Michl
*Attorney, Agent, or Firm*—W. J. Farrington; J. C. Logomasini; S. M. Tarter

[57] ABSTRACT

Polymer compositions evolve reduced amounts of noxious gases on combustion when containing an organometallic complex of a metal having an atomic number from 24 to 30.

3 Claims, No Drawings

POLYMER COMPOSITIONS EVOLVING REDUCED AMOUNTS OF NOXIOUS GASES ON COMBUSTION

BACKGROUND OF THE INVENTION

This invention relates to a method for reducing the amount of noxious gas evolved during the combustion of a polymer.

It is known that when nitrogenous polymers are burned the combustion products are often found to comprise hydrogen cyanide. In view of the known toxicity of this gas, it is desirable that the amount of any such gas released when these polymers burn be minimized.

It is also known that when a polymer contains a halogen or is made flame-retardant by the incorporation therein of a halogen-containing material, hydrogen halides are evolved during thermal decomposition of the polymer.

It has now been discovered that the amounts of these noxious gases evolved during high temperature decomposition of such polymers can be controlled by the use of a minor amount of certain organometallic additives.

SUMMARY OF THE INVENTION

The present invention provides a polymer composition which on thermal decomposition generates a noxious gas, (which in the context of this invention is understood to mean hydrogen cyanide and/or a hydrogen halide), and from 1 to 10 percent by weight of an organometallic complex of a metal having an atomic number from 24 to 30, the percentage being based on the weight of the polymer composition.

While the mechanism is not fully understood, it is believed that when the noxious gas is generated, it is at once sequestered by the organo-metallic complex, thus preventing the evolution of the gas into the atmosphere.

Polymers which generate hydrogen cyanide upon thermal decomposition include for example polyamides, polyimides, melamine/formaldehyde, urea/formaldehyde, polyurethanes and acrylonitrile polymers (including copolymers). It is found that the additives of the invention are particularly suitable for use with polymers containing nitrile monomers such as styrene/acrylonitrile and acrylonitrile/butadiene/styrene polymers including variations such as substitution of methacrylonitrile for acrylonitrile, chloroprene for butadiene and chlorostyrene or α-methylstyrene for styrene.

Polymer compositions yielding hydrogen halides on thermal decomposition include those with halogen in one or more of the monomers used to form the polymer. Such monomers include for example, vinyl chloride, vinylidene chloride, chlorostyrene, tribromophenyl acrylate and chloroprene. Alternatively, or perhaps additionally, the halogen may be present in the polymer composition in the form of a flame-retardant additive such as one of the many halogenated aromatic compounds that are currently commercially available.

The organometallic compound used in the present invention comprises a metal having an atomic number from 24 to 30, and particularly from 27 to 30 in the form of a complex with a polydentate organic ligand such as ethylene diamine tetraacetic acid (EDTA), acetylacetonates and phthalocyanines. Where the metal valence leaves the ligand unsatisfied, an alkali metal may be used to provide a total metal moiety with the appropriate valence. Thus for example, the EDTA ligand has a valence of 4 and therefore divalent cobalt requires the presence of two alkali metal atoms to provide a stable complex. The preferred organometallic complexes have EDTA as the ligand.

The polymer composition may additionally comprise additives such as antioxidants, stabilizers of various sorts, fillers and flame retardants. It is advisable when the polymer compositions of the invention comprise both a nitrogenous polymer and a source of halogen, that the quantities of the additive be adjusted to give a balance of the desired properties.

DESCRIPTION OF THE PREFERRED EMBODIMENTS

The examples which follow demonstrate the effectiveness of the organometallic additives of the invention. The important measurements of hydrogen cyanide gas evolved on burning are made using an NBS smoke test chamber. This is a closed chamber adapted to permit two kinds of combustion, smouldering and flaming. Gases evolved are sampled and analyzed. The actual measurement of the amount of HCN evolved is not considered to be part of this invention. In this regard, any method capable of detecting amounts of HCN as low as one part per million can be used to measure the amount of HCN evolved. These methods which are well known to those skilled in the art include colorimetric analysis, polarographic measurements, gas chromatographic measurements and electrochemical measurements. The results are expressed in parts per million by volume per 10 grams burned (ppmv/10 g).

The NBS Smoke Test Chamber is fully described in ASTM Special Technical Publication 422, page 174.

The measurement of the amount of hydrogen halide evolved was performed by sampling the evolved gases, dissolving the soluble components in water and determining the amount of hydrogen halide therein by passing the aqueous solution through a Dionix Corporation Model 10 Ion Chromatograph.

EXAMPLES 1–5

These Examples demonstrate the effectiveness of the organometallic additives described in this invention in reducing the amount of hydrogen cyanide evolved when an ABS polymer burns.

In each of the following Examples five parts of the organometallic complex were blended with 95 parts of an ABS polymer containing 33 percent of acrylonitrile. The amount of hydrogen cyanide evolved under smouldering conditions is determined by the method described above. The results obtained are set forth in Table I below.

TABLE I

| Example (Comparative) | Organometallic Additive | ppmv HCN/ 10g. consumed |
|---|---|---|
|  | none | 200 |
| 1 | Na$_2$Co/EDTA | 80–90 |
| 2 | Na$_2$Mn/EDTA | 90 |
| 3 | Na$_2$Zn/EDTA | 70–100 |
| 4 | Na$_2$Cu/EDTA | 60–70 |
| 5 | NaFE/EDTA | 110–130 |

As can be seen from the above, a spectacular reduction in evolved hydrogen cyanide is obtained by addition of only five percent by weight of the organometallic complex.

EXAMPLES 6-8

These Examples demonstrate the effectiveness of the addition of five percent by weight of organometallic additives described in the invention in reducing the amount of hydrogen chloride evolved when an ACS (a copolymer formed by polymerizing styrene and acrylonitrile in the presence of chloroprene) is burned.

The amount of hydrogen chloride evolved is measured using the method described above and the results are set down in Table II below.

TABLE II

| Example | Organometallic Additive | ppmv HCl 10g. consumed |
| --- | --- | --- |
| (comparative) | None | 700 |
| 6 | $Na_2Co/EDTA$ | 560 |
| 7 | $Na_2Zn/EDTA$ | 580 |
| 8 | $Na_2Cu/EDTA$ | 560 |

From this table it is clear that the addition of a mere five percent by weight of the organometallic compound reduced the evolution of hydrogen chloride from burning ACS.

Polymers of the present may be further modified with conventional additives and adjuvants such as fillers, plasticizers, U.V. stabilizers, heat stabilizers, antioxidants, etc. Care should be taken when formulating or compounding the polymers of the present invention so as not to affect adversely the toxic gas-suppressing properties of the additives therein.

The above Examples are for the purpose of illustration only and should not be taken as implying any limitation on the scope of the present invention.

It is anticipated that many minor modifications and variations could be made in the invention described herein without changing the essential elements thereof and it is understood that all such modifications and variations are embraced within the purview of this invention.

What is claimed is:

1. A polymer composition comprising a styrene/acrylonitrile copolymer and a diene rubber substrate with styrene and acrylonitrile grafted thereon which on thermal decomposition generates hydrogen cyanide, which composition comprises from 1 to 10 percent by weight of an organometallic complex comprising EDTA and a metal having an atomic number between 24 and 30, the percentage being based on the polymer composition.

2. The polymer composition of claim 1 which comprises from 3 to 8 percent by weight based on the weight of the polymer composition, of an EDTA complex of a metal having an atomic number from 27 to 30.

3. A polymer composition according to claim 1 that comprises a halogen-containing flame retardant component.

* * * * *